(12) United States Patent
Glickman et al.

(10) Patent No.: US 11,142,170 B2
(45) Date of Patent: Oct. 12, 2021

(54) POP-UP WASHER NOZZLE WITH DEFROST FEATURE

(71) Applicant: Ford Global Technologies, LLC, Dearborn, MI (US)

(72) Inventors: David Brian Glickman, Southfield, MI (US); Paul Kenneth Dellock, Northville, MI (US); Stuart C. Salter, White Lake, MI (US); Venkatesh Krishnan, Canton, MI (US); Jose Garcia Crespo, Bloomfield Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 732 days.

(21) Appl. No.: 15/615,866

(22) Filed: Jun. 7, 2017

(65) Prior Publication Data
US 2018/0354467 A1    Dec. 13, 2018

(51) Int. Cl.
| | |
|---|---|
| *B60S 1/56* | (2006.01) |
| *B60S 1/52* | (2006.01) |
| *B60S 1/48* | (2006.01) |
| *B60S 1/66* | (2006.01) |
| *B29C 45/14* | (2006.01) |

(Continued)

(52) U.S. Cl.
CPC ............. *B60S 1/56* (2013.01); *B05B 15/70* (2018.02); *B60S 1/488* (2013.01); *B60S 1/528* (2013.01); *B60S 1/66* (2013.01); *B05B 1/24* (2013.01); *B05B 15/74* (2018.02); *B29C 45/14549* (2013.01); *B29K 2071/00* (2013.01); *B29K 2077/00* (2013.01)

(58) Field of Classification Search
CPC .... B60S 1/56; B60S 1/24; B60S 1/488; B60S 1/58; B60S 1/586; B60S 1/023; B60S 1/026; B60S 1/08; B60S 1/0818; B60S 1/0848; B05B 15/70; B05B 1/24; B60H 1/00785; B60H 1/2215; B60H 1/2221
USPC ........................................ 134/105, 123, 198
See application file for complete search history.

(56) References Cited

U.S. PATENT DOCUMENTS

| | | | | |
|---|---|---|---|---|
| 3,319,891 A | * | 5/1967 | Campbell | ................ B05B 1/24 239/130 |
| 4,230,934 A | * | 10/1980 | ter Beek | ................ B29C 45/30 219/421 |

(Continued)

FOREIGN PATENT DOCUMENTS

| | | | | |
|---|---|---|---|---|
| DE | 3100092 | * | 7/1982 | ............... H05B 3/82 |
| DE | 10048014 | * | 4/2002 | ............... B60S 1/52 |

(Continued)

*Primary Examiner* — Alex M Valvis
*Assistant Examiner* — Christopher R Dandridge
(74) *Attorney, Agent, or Firm* — David Coppiellie; Carlson, Gaskey & Olds, P.C.

(57) ABSTRACT

An apparatus, according to an exemplary aspect of the present disclosure includes, among other things, a housing and a plunger moveable between a retracted position within the housing and an extended position to spray fluid on a vehicle component. A heater is mounted for movement with the plunger. A method according to an exemplary aspect of the present disclosure includes, among other things, molding a heater element and a body having an internal channel extending between a fluid inlet and a fluid outlet together to form a plunger configured to spray fluid out of the fluid outlet.

18 Claims, 3 Drawing Sheets

(51) Int. Cl.
  *B05B 15/70* (2018.01)
  *B05B 15/74* (2018.01)
  *B05B 1/24* (2006.01)
  *B29K 71/00* (2006.01)
  *B29K 77/00* (2006.01)

(56) References Cited

U.S. PATENT DOCUMENTS

| | | | | |
|---|---|---|---|---|
| 4,644,140 A * | 2/1987 | Hillinger | ............... | B05B 1/24 |
| | | | | 219/421 |
| 5,269,464 A * | 12/1993 | Epple | ............... | B60S 1/528 |
| | | | | 239/130 |
| 5,762,271 A * | 6/1998 | Lind | ............... | B05B 1/304 |
| | | | | 239/284.2 |
| 5,979,796 A * | 11/1999 | Ponziani | ............... | B60S 1/52 |
| | | | | 219/202 |
| 6,186,156 B1 | 2/2001 | Schlein | | |
| 6,234,410 B1 * | 5/2001 | Martin | ............... | B60S 1/528 |
| | | | | 239/284.1 |
| 6,719,215 B2 * | 4/2004 | Drouillard | ............... | B60S 1/485 |
| | | | | 239/284.1 |
| 6,905,078 B1 * | 6/2005 | Gattuso | ............... | B05B 3/0413 |
| | | | | 239/11 |
| 7,703,188 B2 * | 4/2010 | Feick | ............... | H05B 3/42 |
| | | | | 29/421.1 |
| 7,824,572 B2 * | 11/2010 | Okamoto | ............... | C08K 5/01 |
| | | | | 252/299.01 |
| 8,876,019 B2 * | 11/2014 | Discher | ............... | B60S 1/528 |
| | | | | 239/205 |
| 2006/0102744 A1 | 5/2006 | Arkasjevski et al. | | |
| 2016/0096486 A1 * | 4/2016 | Dziurda | ............... | B60R 1/00 |
| | | | | 348/375 |
| 2017/0021809 A1 | 1/2017 | Trebouet et al. | | |

FOREIGN PATENT DOCUMENTS

| | | | | |
|---|---|---|---|---|
| DE | 102009006280 | | 7/2010 | |
| EP | 1028042 | | 8/2000 | |
| JP | 2013154771 | * | 8/2013 | ............... B60R 1/00 |

* cited by examiner

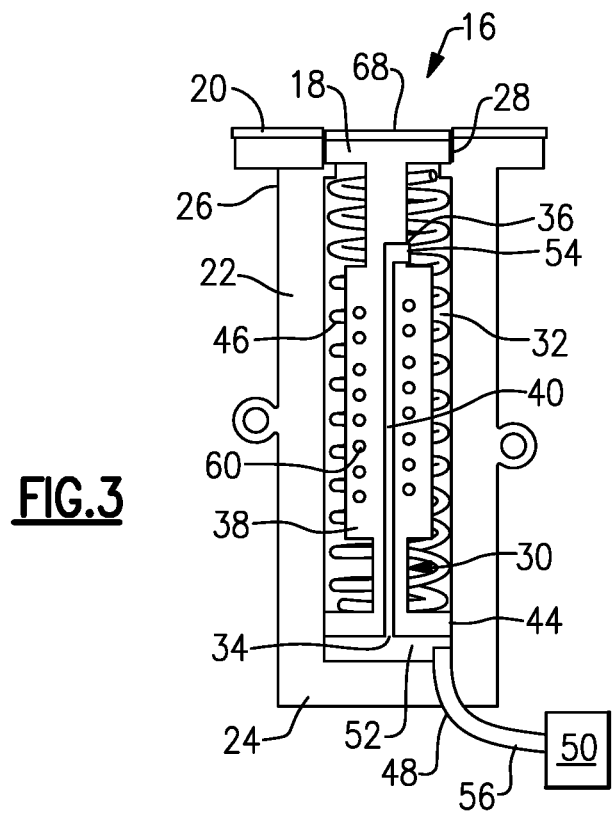
FIG.3
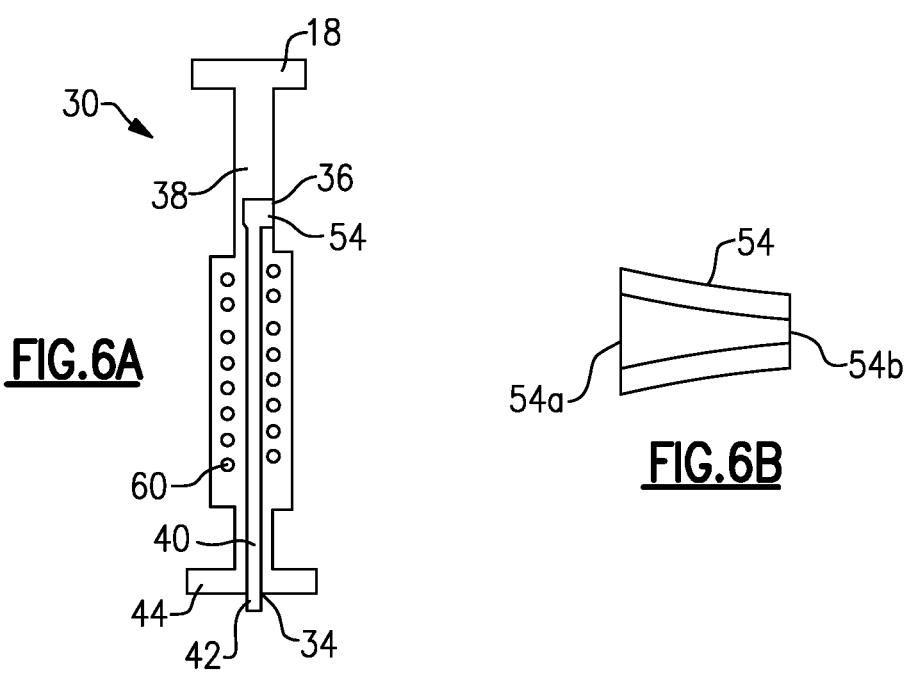
FIG.6A
FIG.6B

POP-UP WASHER NOZZLE WITH DEFROST FEATURE

TECHNICAL FIELD

This disclosure relates to an exemplary apparatus and method of providing a pop-up washer nozzle with a defrost feature.

BACKGROUND

Vehicles can include a variety of cameras and sensors such as radar and infrared sensors, for example. In order for the cameras and sensors, to work properly, they need to be kept clean and free from dust, mud, or other types of debris. Keeping cameras and sensors clean is especially important for autonomous vehicle applications.

SUMMARY

An apparatus according to an exemplary aspect of the present disclosure includes, among other things, a housing and a plunger moveable between a retracted position within the housing and an extended position to spray fluid on a vehicle component. A heater is mounted for movement with the plunger.

In a further non-limiting embodiment of the foregoing apparatus, the plunger includes a nozzle.

In a further non-limiting embodiment of either of the foregoing apparatus, the plunger includes a fluid inlet and a fluid outlet at the nozzle.

In a further non-limiting embodiment of any of the foregoing apparatus, the plunger includes an internal fluid channel extending from the fluid inlet to the fluid outlet, and wherein the heater is positioned to surround at least a portion of the internal fluid channel.

In a further non-limiting embodiment of any of the foregoing apparatus, the plunger includes a head at a distal end from the fluid inlet, and wherein the head is configured to be flush with a vehicle exterior surface when the plunger is in the retracted position.

In a further non-limiting embodiment of any of the foregoing apparatus, the vehicle component is a camera and/or a sensor.

In a further non-limiting embodiment of any of the foregoing apparatus, the apparatus includes a resilient member that biases the plunger to the retracted position.

In a further non-limiting embodiment of any of the foregoing apparatus, the heater comprises a heating element wire.

In a further non-limiting embodiment of any of the foregoing apparatus, the plunger includes a body having an internal flow path extending from a fluid inlet to a fluid outlet, and wherein the heating element wire surrounds at least a portion of the internal flow path.

In a further non-limiting embodiment of any of the foregoing apparatus, the plunger includes a body having an outlet tube positioned between a fluid inlet and a fluid outlet, and wherein the heating element wire is wrapped around the outlet tube.

In a further non-limiting embodiment of any of the foregoing apparatus, the housing includes a fluid inlet to supply washing fluid to a plunger fluid inlet, and wherein the plunger includes a fluid outlet comprising a nozzle.

An apparatus according to another exemplary aspect of the present disclosure includes, among other things, a housing and a plunger mounted within the housing. The plunger comprises a body having an internal channel extending between a fluid inlet and a nozzle at a fluid outlet. The plunger is moveable between a retracted position and an extended position to spray fluid out of the nozzle. A heater surrounds at least a portion of the internal channel.

In a further non-limiting embodiment of any of the foregoing apparatus, the heater comprises a heating element wire that surrounds the internal channel.

In a further non-limiting embodiment of any of the foregoing apparatus, the housing includes an inlet tube to supply washing fluid to the fluid inlet of the plunger, and including an outlet tube forming the internal channel, wherein the heater comprises a heating element that is wrapped around the outlet tube.

In a further non-limiting embodiment of any of the foregoing apparatus, the body has a foot at one end and a head at an opposite end, and including a resilient member positioned between the foot and the head to bias the plunger to the retracted position.

In a further non-limiting embodiment of any of the foregoing apparatus, the housing is enclosed at one end to define a fluid reservoir and is open at an opposite end to allow the head to extend outwardly of a vehicle exterior surface surrounding the opposite end of the housing, and wherein the head is generally flush with the vehicle exterior surface when in the retracted position.

In a further non-limiting embodiment of any of the foregoing apparatus, an autonomous vehicle provides the vehicle exterior surface, and wherein the nozzle is configured to spray fluid towards at least one of a vehicle camera and a sensor.

A method according to another exemplary aspect of the present disclosure includes the steps of, among other things: molding a heater element and a body having an internal channel extending between a fluid inlet and a fluid outlet together to form a plunger configured to spray fluid out of the fluid outlet.

In a further non-limiting embodiment of the foregoing method, the method includes molding connecting wires for the heater element and a nozzle at the fluid outlet as part of the plunger.

In a further non-limiting embodiment of either of the foregoing methods, the molding step comprises an insert molding process.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 3 is a side view of the pop-up washer nozzle in the retracted position.

FIG. 6A shows a plunger from the pop-up washer nozzle of FIG. 3.

FIG. 6B shows one example of a nozzle from the plunger of FIG. 6A.

DETAILED DESCRIPTION

This disclosure details exemplary apparatus and methods of providing a pop-up washer nozzle with a defrost feature for a vehicle. These and other features are discussed in greater detail in the following paragraphs of this detailed description.

Figure 1:
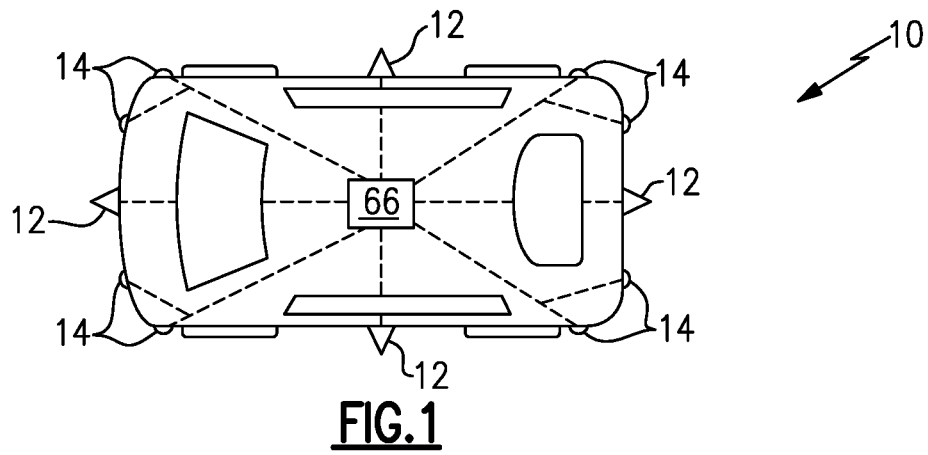
FIG. 1 schematically illustrates a vehicle including a plurality of cameras and sensors.

FIG. 1 shows a vehicle 10 that includes a plurality of cameras 12 and a plurality of sensors 14 at various locations on the vehicle 10. The sensors 14 can include radar, Lidar NIR and infrared sensors, for example. The cameras 12 and sensors 14 are used for various vehicle applications such as park-assist, collision avoidance, back-up viewing, etc. In one example, the vehicle 10 comprises an autonomous vehicle.

Figure 2A:
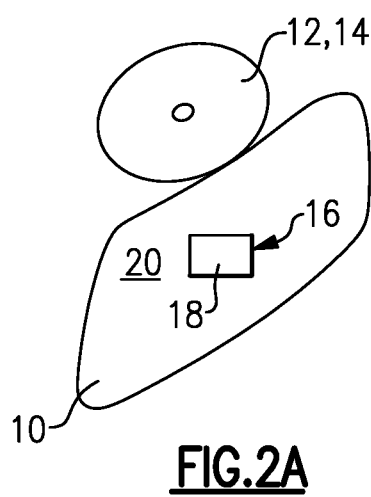
FIG. 2A schematically illustrates a pop-up washer nozzle in a retracted position on a vehicle.
Figure 2B:
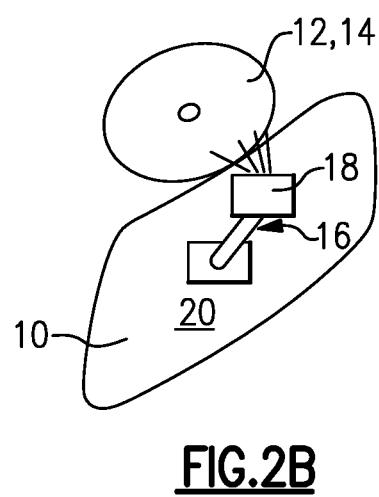
FIG. 2B is the pop-up washer nozzle of FIG. 2A in a deployed position.

For vehicles such as autonomous vehicles, it is critical that the cameras 12 and sensors 14 remain clean. To ensure that surfaces of the cameras 12 and sensors 14 are free from debris, a pop-up washer nozzle 16 is mounted to the vehicle 10 at each camera and sensor location. FIG. 2A shows one example of the pop-up washer nozzle 16 in a retracted position, while FIG. 2B shows the nozzle 16 in an extended or deployed position where fluid is being sprayed on a camera 12 and/or sensor 14. In the retracted position, a head 18 of the nozzle 16 is flush with an exterior surface 20 of the vehicle such that the nozzle 16 remains hidden. This provides a more aesthetically pleasing appearance for the vehicle while also helping to prevent the nozzle 16 from being damaged when inactivated.

FIG. 3 shows one example of the pop-up washer nozzle 16 in the retracted position. A housing 22 is mounted within the vehicle 10. The housing 22 has a first end 24 that is enclosed and an opposite second end 26 that includes an opening 28. A plunger 30 is positioned within an internal cavity 32 of the housing 22, and is moveable between a retracted position and an extended or deployed position. The plunger 30 includes a fluid inlet 34 that receives fluid pumped into the internal cavity 32 and a fluid outlet 36 where fluid can be sprayed in a desired direction.

Figure 5:
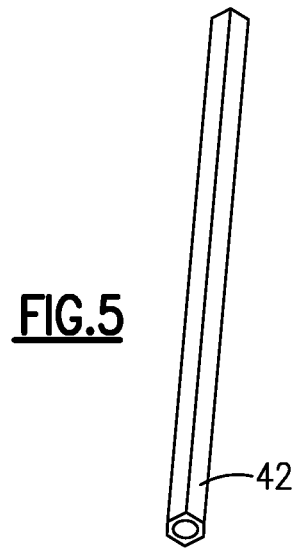
FIG. 5 shows one example of an outlet tube from the pop-up washer nozzle.

The plunger 30 comprises a body 38 within an internal channel 40 that extends from the fluid inlet 34 to the fluid outlet 36. Fluid can flow directly within the channel 40 or an outlet tube 42 (FIG. 5) can be used to provide the channel 40. For example, the outlet tube 42 can be molded within the body 38 to provide the channel 40 that connects the fluid inlet 34 to the fluid outlet 36. The body 38 further includes a foot 44 at one end and the head 18 at an opposite end. A resilient member 46 is used to bias the plunger 30 to the retracted position. In one example, the resilient member 46 comprises a coil spring that reacts between the foot 44 and head 18 of the plunger 30.

Figure 8:
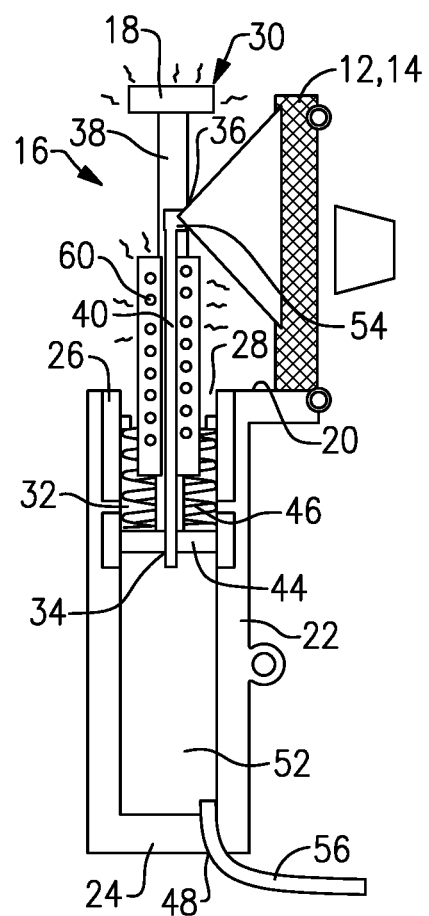
FIG. 8 shows the pop-up washer nozzle in an extended, deployed position spraying a vehicle component.

The head 18 of the plunger 30 extends outwardly of the opening 28 in the housing 22 when the plunger 30 is moved to the deployed or active position. The housing 22 includes an inlet orifice or port 48 that is in fluid communication with a fluid supply 50. In one example, the fluid supply 50 includes washer or cleaning fluid. When activated, the fluid supply 50 delivers fluid to the housing 22 via an inlet tube 56 and starts to fill an area 52 between the first end 24 of the housing 22 and the foot 44 of the plunger 30. As pressurized fluid is pumped in, the pressure builds up and forces the plunger 30 to move up against the biasing force of the resilient member 46. The resilient member 46 compresses and the plunger 30 moves through the opening 28 in the housing 22 to the deployed position to clean the camera 12 or sensor 14 (FIG. 8). In one example, the fluid outlet 36 of the plunger 30 comprises a nozzle 54 that ejects pressurized spray against a camera or sensor surface. As shown in FIG. 6B, the nozzle 54 tapers from a wider inlet opening 54a to a narrower exit opening 54b to increase the pressure of the spray. Once the cleaning cycle is complete, fluid is no longer pumped into the housing 22, the pressure is relieved, and the resilient member 46 returns the plunger 30 to the retracted position.

When subjected to cold operating conditions, the washing fluid within the pop-up washer nozzle 16 may freeze and not be able to be sprayed during a cleaning cycle. Additionally, the pop-up washer nozzle 16 can become covered with ice, which can cause the pop-up washer nozzle 16 to be stuck in the retracted position. The pressure force that moves the plunger 30 may not be high enough to break through the ice. This would result in the driver having to dislodge the ice so that the nozzle 16 can operate as intended. However, with autonomous vehicles there is no driver to remove the ice. Thus, the subject pop-up washer nozzle 16 includes a unique defrost feature to heat the fluid and to melt the ice.

In one example, the defrost feature comprises a heater 60 (FIG. 4) that is mounted for movement with the plunger 30 (FIG. 6A). In one example, the heater 60 comprises a heater wire element 62 that is insert molded with connecting wires 64 in the plunger body 38. In one example, the wire element 62 comprises nichrome 80/20 material (80% nickel, 20% chromium); however, other materials such as tungsten wire could also be used. The heater wire element 62 is molded/encased/enclosed within the plunger body 38 in a position that surrounds the internal channel 40. In one example, the plunger body 38 has an increased/enlarged body section within which the heater 60 is enclosed. This heater 60 is configured to surround a substantial length of the internal channel 40 between the inlet 34 and outlet 36 to provide uniform heating throughout the body 38.

As discussed above, in another example, there is an outlet tube 42 that is molded within the plunger body 38 to form the internal channel 40. In this configuration, the heater wire element 62 wraps around the outlet tube 42 and has the connecting wires 64 attached. In this configuration, the nozzle 54 is attached to the outlet tube 42 at an outlet end. In one example, the outlet tube 42, wire elements 62, and nozzle 54 are all insert molded within the body 38 to form the plunger 30.

In one example, the housing 22 is made from glass filled nylon 6 and the plunger 30 is made from a high temperature polyether ether ketone (PEEK) material. PEEK is an organic thermoplastic polymer which can be used to incorporate a molded in heater 60. In one example, the nozzle 54 is also made from a PEEK material. In one example, the inlet tube 56 is made from a reinforced ethylene propylene diene monomer (M-class) rubber (EPDM rubber), and the outlet tube is made from a stainless steel.

In one example, the plunger 30 is injection molded from a high temperature liquid crystal polymer (LCP) that has been modified by adding highly conductive ceramic material. This type of material is effective as it can withstand continuous temperatures of 250 degrees Celsius. LCP is a good electrical and thermal insulator which is crucial to maintaining the desired high electrical resistivity required to ensure the heater 60 does not short out, while also significantly improving thermal conductivity of the material. This type of material also has high melt flow and can fill long and complex flow paths with minimal warpage. The material also has high mechanical strength, excellent dimensional stability and organic solvent resistance, as well as providing fast process cycling.

In one example, the LCP includes an additive of aluminum nitride (AlN) that is added in an amount of approximately 50% by weight or 22% by volume. Another example of an additive material is boron nitride. These additive materials provide a plastic material with significantly improved conductivity, which will allow the heat from the heater 60 to transfer across the entire surface of the plunger 30. It should be understood that while the disclosed materials are preferred, other similar and/or suitable materials could also be used.

Figure 7:
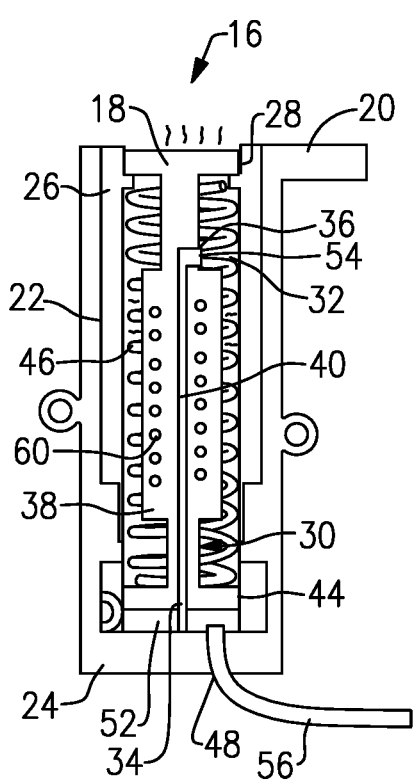
FIG. 7 shows the pop-up washer nozzle in a retracted position with the heater active.

As the heater 60 increases in temperature during activation, the thermally conductive plastic will heat the entire volume of the plunger 30 as shown in FIG. 7. The thermally conductive material will also quickly transfer heat to the top cap or head 18 of the plunger 30 to melt away ice and snow. In one example, the heater 60 is configured to heat the plunger 30 to approximately 150 degrees Celsius. Once the washing system is activated and it is determined that heating is required, the heater 60 will be able to reach 150 degrees Celsius in a matter of seconds. This will quickly melt the ice and allow the plunger 30 to be able to move to the deployed position to complete the washing cycle as shown in FIG. 8. Additionally, the heat will also be able to melt the washing fluid if it becomes frozen due to low temperatures.

Figure 4:
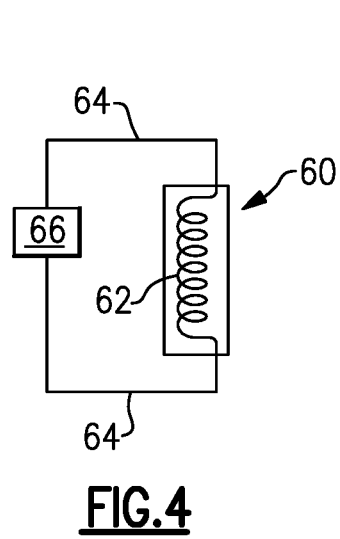
FIG. 4 shows one example of a heater from the pop-up washer nozzle.

The pop-up washer nozzles 16 for each of the cameras 12 and sensors 14 are activated and controlled via a system controller 66 (FIGS. 1 and 4). Temperature sensors 14 can be used to determine whether the heater 60 should be activated to remove ice and snow.

The subject invention provides a pop-up washer nozzle that includes an internal heater that will prevent the nozzle from freezing during cold weather conditions. This is especially important for autonomous vehicles, which include multiple cameras, and sensors such as radar, Lidar NIR and infrared sensors. It is vital that cameras and sensors for autonomous vehicles stay clean and free from debris. When activated, the nozzle sprays washing fluid on the camera and/or sensor. The heater is activated below certain specified temperature levels to prevent fluid from freezing within the nozzle. The heater is also able to melt any ice that may build up over a head of the nozzle when retracted. The pop-up washer nozzle is retractable within the vehicle such that the nozzle is hidden from sight unless activated to provide an aesthetically pleasing appearance. In one example, the head 18 of the nozzle 16 includes a layer of material 68 (FIG. 3) that matches the material of the exterior surface 20 of the vehicle 10.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An apparatus, comprising:
a housing that has an open end and an enclosed end opposite of the open end to define an internal cavity;
a plunger, moveable within the internal cavity between a retracted position and an extended position to spray fluid on a vehicle component, and wherein a head of the plunger extends outwardly of the open end of the housing when in the extended position, and wherein the plunger includes an internal fluid channel extending from a fluid inlet to a fluid outlet;
a resilient member that biases the plunger to the retracted position, wherein the resilient member is positioned within the internal cavity and surrounds the body; and
a heater mounted for movement with the plunger, wherein the heater comprises a wire element that is molded and enclosed within a body of the plunger and surrounds the internal fluid channel.

2. The apparatus according to claim 1, wherein the plunger includes a nozzle.

3. The apparatus according to claim 2, wherein the fluid outlet is at the nozzle.

4. The apparatus according to claim 3, wherein the head is at a distal end from the fluid inlet, and wherein the head is configured to be flush with a vehicle exterior surface when the plunger is in the retracted position.

5. The apparatus according to claim 4, wherein the vehicle component is a camera and/or a sensor.

6. The apparatus according to claim 1, wherein the plunger includes the body having an outlet tube positioned between the fluid inlet and the fluid outlet, and wherein the wire element is wrapped around the outlet tube.

7. The apparatus according to claim 1, wherein the plunger includes a foot at one end with the head being at an opposite end, and wherein a fluid reservoir is formed between the foot and the enclosed end of the housing, and wherein the housing includes a housing fluid inlet to supply washing fluid to the fluid reservoir which is open to the fluid inlet of the plunger that is formed in the foot, and wherein the fluid outlet of the plunger is in the head comprising a nozzle, and wherein the resilient member is positioned between the foot and the head such that as pressure builds up within the fluid reservoir, the plunger moves up against a biasing force of the resilient member to move the nozzle to the extended position, and when pressure falls below the biasing force, the resilient member biases the plunger to the retracted position.

8. An apparatus, comprising:
a housing that has an open end and an enclosed end opposite of the open end to define an internal cavity;
a plunger mounted within the internal cavity, the plunger comprising a body having an internal channel extending between a fluid inlet and a nozzle at a fluid outlet, wherein the plunger is moveable between a retracted position and an extended position to spray fluid out of the nozzle;

a resilient member that biases the plunger to the retracted position, wherein the resilient member is positioned within the internal cavity and surrounds the body;

and a heater mounted for movement with the plunger, wherein the heater comprises a wire element that is molded and enclosed within the body of the plunger and surrounds the internal channel.

9. The apparatus according to claim 8, wherein the housing includes an inlet tube to supply washing fluid to the fluid inlet of the plunger, and including an outlet tube forming the internal channel, wherein the wire element is wrapped around the outlet tube, and wherein the outlet tube, the heater, and the nozzle are all molded within the body to form the plunger.

10. The apparatus according to claim 8, wherein the body has a foot at one end and a head at an opposite end, and wherein a fluid reservoir is formed between the foot and the enclosed end of the housing, and wherein the housing includes a housing fluid inlet to supply washing fluid to the fluid reservoir which is open to the fluid inlet in the foot of the plunger, and wherein the resilient member is positioned between the foot and the head such that as pressure builds up within the fluid reservoir, the plunger moves up against a biasing force of the resilient member to move the nozzle to the extended position, and when pressure falls below the biasing force, the resilient member biases the plunger to the retracted position.

11. The apparatus according to claim 10, wherein the head extends outwardly of the open end of the housing and beyond a vehicle exterior surface when in the extended position, and wherein the head is generally flush with the vehicle exterior surface when in the retracted position.

12. The apparatus according to claim 11, including an autonomous vehicle that provides the vehicle exterior surface, and wherein the nozzle is configured to spray fluid towards at least one of a vehicle camera and a sensor.

13. A method, comprising:

providing a housing that has an open end and an enclosed end opposite of the open end to define an internal cavity;

molding a heater element and a body having an internal channel extending between a fluid inlet and a fluid outlet together to form a plunger configured to spray fluid out of the fluid outlet, and including forming the heater element as a wire element that is molded and enclosed within the body of the plunger such that the wire element surrounds the internal channel within the body;

positioning the plunger within the internal cavity such that the plunger is moveable between a retracted position and an extended position; and positioning a resilient member within the internal cavity to bias the plunger to the retracted position.

14. The method according to claim 13, including molding connecting wires for the heater element and a nozzle at the fluid outlet as part of the plunger.

15. The method according to claim 13, wherein the molding step comprises an insert molding process.

16. The method according to claim 13, wherein the molding step includes embedding the heater element within the body to surround the internal channel.

17. An apparatus, comprising:

a housing that has an open end and an enclosed end opposite of the open end to define an internal cavity;

a plunger moveable within the internal cavity between a retracted position and an extended position to spray fluid on a vehicle component, and wherein a head of the plunger extends outwardly of the open end of the housing when in the extended position;

a resilient member that biases the plunger to the retracted position, wherein the resilient member is positioned within the internal cavity;

a heater mounted for movement with the plunger, wherein the heater is embedded within a body of the plunger and surrounds an internal fluid channel within the plunger; and wherein the heater comprises a heater wire element that is molded and enclosed within the body of the plunger such that the heater wire element surrounds the internal fluid channel within the body.

18. The apparatus according to claim 1, wherein the plunger is made from a liquid crystal polymer material, the wire element is embedded within the liquid crystal polymer material, and the housing is made from a thermoplastic polymer.

* * * * *